United States Patent Office 3,436,412
Patented Apr. 1, 1969

3,436,412
POLYDEHYDRO 17α-ETHYNYLESTRAN-17β-OLS AND ESTERS
Leland J. Chinn, Morton Grove, Ill., assignor to G. D. Searle & Co., Chicago, Ill., a corporation of Delaware
No Drawing. Filed Sept. 26, 1966, Ser. No. 581,702
Int. Cl. C07c 169/08, 169/12
U.S. Cl. 260—397.5                   5 Claims This invention relates to polydehydro 17α-ethynylestran-17β-ols and esters substituted in the 3-position by a monovalent hydrocarbon radical, and to processes for the preparation thereof. More particularly, this invention relates to compounds of the formula

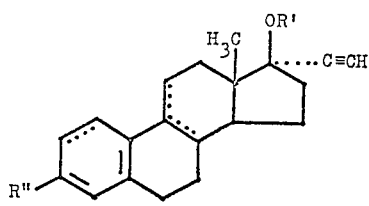

preparable by (1) the Grignard reaction of 17α-ethynyl-17β-hydroxyestra-4,9-dien-3-one [J. Amer. Chem. Soc., 82, 2402 (1960)] with a magnesium bromide of the formula

R″MgBr (2) esterification of the product of (1) with acetic anhydride in pyridine, and (3) saponification of the product of (2) with methanolic potassium hydroxide, as illustrated in the working examples hereafter. In the foregoing formula(s), R' represents hydrogen or an acetyl radical, R″ represents a lower alkyl or phenyl radical, and the dotted lines indicate that the compounds are $\Delta^8$ or $\Delta^{9(11)}$ and can also be $\Delta^1$.

The compounds to which this invention relates are useful by reason of their valuable pharmacological properties. For example, they lower plasma cholesterol levels in hypercholesterolemic animals; they are also estrogenic.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

17α - ethynyl - 3 - methylestra - 3,5(10),9(11) - trien-17β-ol.—To a solution of approximately 90 parts of methylmagnesium bromide in 175 parts of anhydrous ether is added, with stirring under reflux at a rate such that gentle boiling is maintained, a solution of 4 parts of 17α - ethynyl - 17β - hydroxyestra-4,9(11)-dien-3-one in a mixture of 45 parts of tetrahydrofuran and 35 parts of anhydrous ether. When the addition is complete, stirring is continued while the reactants are heated at the boiling point under reflux for 6 hours, then chilled, and finally diluted with an equal volume of ice water. The resultant mixture is acidified with approximately 20% hydrochloric acid. The organic phase is separated, washed with water, dried over anhydrous sodium sulfate, and stripped of solvent by vacuum distillation. The residual viscous oil is chromatographed on silica gel. Elution with benzene, followed by distillation of solvent from the eluate and re-crystallization of the residue from aqueous methanol, affords 17α - ethynyl - 3-methylestra-3,5(10),9(11)-trien-17β-ol melting at 110–113°. The product has the formula

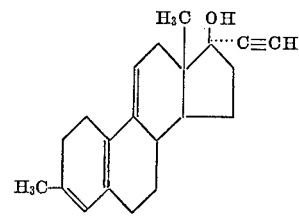

Example 2

17β - acetoxy - 17α - ethynyl - 3 - methylestra - 1,3,5 (10),9(11) - tetraene.—A solution of approximately 7 parts of 17 - ethynyl - 3 - methylestra-3,5(10),9(11)-trien-17β-ol in a mixture of 200 parts of acetic anhydride and 200 parts of pyridine is heated at 65° for 18 hours, then poured into 3 volumes of ice water. The solid which precipitates is filtered off, washed with water, dried in air, and recrystallized from ether to give 17β-acetoxy-17α - ethynyl - 3 - methylestra - 1,3,5(10),9(11) - tetraene melting at 185–188°. The product has the formula

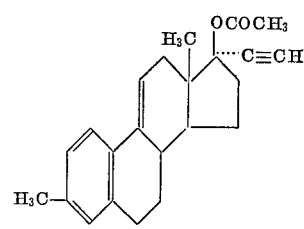

Example 3

17α - ethynyl - 3 - methylestra - 1,3,5(10),9(11) - tetraen-17β-ol.—A mixture of 5 parts of 17β-acetoxy-17α-ethynyl-3-methylestra-1,3,5(10),9(11)-tetraene, 2 parts of potassium hydroxide, 10 parts of water, and 400 parts of methanol is heated at the boiling point under reflux for 1 hour, then chilled and finally poured into 3 volumes of water. The resultant mixture is extracted with ether. The ether extract is dried over anhydrous sodium sulfate and stripped of solvent by vacuum distillation. The residue is 17α-ethynyl-3-methylestra-1,3,5(10),9(11)-tetraen-17β-ol, having the formula

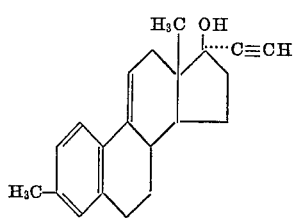

Example 4

17α - ethynyl - 3 - phenylestra-3,5(10),9(11)-trien-17β-ol.—To approximately 36 parts of phenylmagnesium bromide dissolved in approximately 70 parts of anhydrous ether is added, with stirring under reflux at a rate such that gentle boiling is maintained, a solution of 3 parts of 17α-ethynyl-17β-hydroxyestra-4,9(11)-dien-3-one in a mixture of approximately 23 parts of tetrahydrofuran and 35 parts of anhydrous ether. When the addition is complete, stirring is continued while the reactants are heated at the boiling point under reflux for 1½ hours and then maintained at room temperatures for 15 hours. The reaction mixture is thereupon chilled and then diluted with an equal volume of ice water, following which it is acidified with approximately 20% hydrochloric acid. The organic phase is separated, washed with water, dried over anhydrous sodium sulfate, and stripped of solvent by vacuum distillation. The residual oil is chromatographed on silica gel, using benzene and ethyl acetate as developing solvents. From an eluate comprising 5% ethyl acetate in benzene, on evaporation of solvent and recrystallization of the residue from aqueous methanol, 17α-ethynyl-3-phenylestra-3,5(10),9(11)-trien-17β-ol melting at 135–138° is obtained. The product has the formula

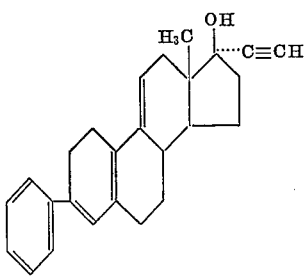

Example 5

17β - acetoxy - 17α - ethynyl - 3 - phenylestra - 1,3,5 (10),9(11)-tetraene.—A solution of 83 parts of 17α-ethynyl-3-phenylestra-3,5(10),9(11)-trien-17β-ol in a mixture of 1000 parts of acetic anhydride and 1000 parts of pyridine is maintained at 65° for 25 hours, then poured into 3 volumes of ice water. The solid precipitate thrown down is collected on a filter, washed with water, dried in air, and recrystallized from ether to give 17β-acetoxy-17α - ethynyl - 3 - phenylestra - 1,3,5(10),9(11)-tetraene melting at 227.5–232.5°. The product has the formula

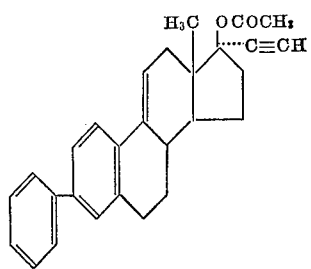

Example 6

3 - ethyl - 17α - ethynylestra - 1,3,5(10),8 - tetraen-17β-ol.—To approximately 101 parts of ethylmagnesium bromide dissolved in approximately 175 parts of anhydrous ether is added, with stirring under reflux at a rate such that gentle boiling is maintained, a solution of 4 parts of 17α-ethynyl-17β-hydroxyestra-4,9(11)-dien-3-one in a mixture of 45 parts of tetrahydrofuran and 35 parts of anhydrous ether. When the addition is complete, stirring is continued while the reactants are heated at the boiling point under reflux for 6 hours, whereupon the reaction mixture is chilled and then diluted with an equal volume of ice water. The resultant mixture is acidified with approximately 20% hydrochloric acid. The organic phase is separated, washed with water, dried over anhydrous sodium sulfate, and stripped of solvent by vacuum distillation. The residue is chromatographed on silica gel, using benzene and hexane as developing solvents. From an eluate comprising 20% hexane in benzene, on evaporation of solvent, 3-ethyl-17α-ethynylestra-1,3,5(10),8-tet-raen-17β-ol is obtained as the residue. The product has the formula

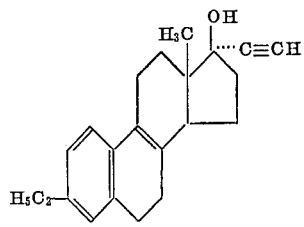

Example 7

17β - acetoxy - 3 - ethyl - 17α - ethynylestra - 1,3,5(10), 8-tetraene.—A solution of 3 parts of 3-ethyl-17α-ethynyl-estra-1,3,5(10),8-tetraen-17β-ol in a mixture of 50 parts of acetic anhydride and 50 parts of pyridine is maintained at 70° for 63 hours. The resultant mixture is poured into 3 volumes of ice water. The solid which precipitates is collected on a filter, washed thereon with water, and dried in air. Recrystallized from methanol, it melts at 146–147.5°. The product thus isolated is 17β-acetoxy-3-ethyl-17α-ethynylestra-1,3,5(10),8-tetraene, of the formula

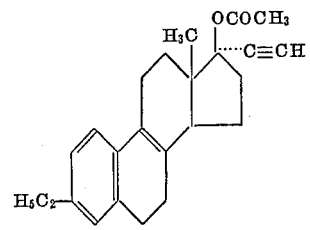

What is claimed is:
1. A compound of the formula

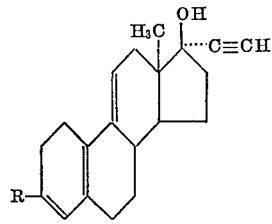

or

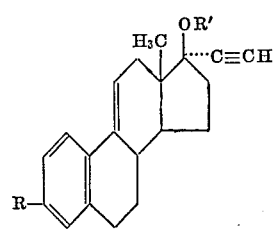

or

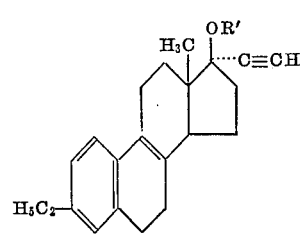

wherein R represents methyl or phenyl and R' represents hydrogen or acetyl.

2. A compound according to claim 1 which is 17α-ethynyl-3-methylestra-3,5(10),9(11)-trien-17β-ol.

3. A compound according to claim 1 which is 17α-ethynyl-3-phenylestra-3,5(10),9(11)-trien-17β-ol.

4. A compound according to claim 1 which is 17β-acetoxy - 17α - ethynyl - 3 - methylestra - 1,3,5(10),9(11)-tetraene.

5. A compound according to claim 1 which is 17β-acetoxy - 3 - ethyl - 17α-ethynylestra-1,3,5(10),8-tetraene.

References Cited

UNITED STATES PATENTS 3,164,617   1/1965   Feather et al.

HENRY A. FRENCH, *Primary Examiner.*

U.S. Cl. X.R

260—999